US010679359B2

(12) United States Patent
Liu et al.

(10) Patent No.: US 10,679,359 B2
(45) Date of Patent: Jun. 9, 2020

(54) MOTION DETECTION METHOD AND RELATED MONITORING CAMERA APPARATUS

(71) Applicant: VIVOTEK INC., New Taipei (TW)

(72) Inventors: Cheng-Chieh Liu, New Taipei (TW); Hsun-Shun Yu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 166 days.

(21) Appl. No.: 16/120,284

(22) Filed: Sep. 2, 2018

(65) Prior Publication Data

US 2019/0096070 A1 Mar. 28, 2019

(30) Foreign Application Priority Data

Sep. 28, 2017 (TW) .............................. 106133382 A

(51) Int. Cl.
*G06T 7/246* (2017.01)
*G06T 7/20* (2017.01)
*H04N 7/18* (2006.01)

(52) U.S. Cl.
CPC ............... *G06T 7/248* (2017.01); *G06T 7/20* (2013.01); *H04N 7/188* (2013.01); *G06T 2207/10016* (2013.01); *G06T 2207/30232* (2013.01)

(58) Field of Classification Search
CPC . G06T 2207/10016; G06T 7/254; G06T 7/20; G06T 2207/30232; G06T 7/215; G06T 7/246; G06T 7/248; G06T 2207/20182; G06T 2207/20221; G06T 7/11; G06T 7/174; H04N 5/144; H04N 5/355; H04N 5/35581; H04N 7/183; H04N 7/188; G08B 13/1961; G08B 13/194; G08B 13/19602; G08B 13/19608; G08B 13/19663
See application file for complete search history.

(56) References Cited

U.S. PATENT DOCUMENTS

| 2003/0165198 | A1* | 9/2003 | Chen | H04N 7/18 375/240.29 |
| 2006/0209957 | A1* | 9/2006 | Riemens | H04N 7/0115 375/240.16 |
| 2015/0097959 | A1* | 4/2015 | Hu | H04N 7/183 348/155 |
| 2016/0005281 | A1* | 1/2016 | Laska | H04N 7/18 348/143 |
| 2017/0169574 | A1* | 6/2017 | Xie | G06K 9/00771 |

\* cited by examiner

*Primary Examiner* — Allahyar Kasraian
(74) *Attorney, Agent, or Firm* — Winston Hsu

(57) ABSTRACT

A motion detection method is applied to a monitoring camera apparatus with motion detection function. The motion detection method includes analyzing a pixel value of each frame from a video stream changed over time, defining a first period and a second period having the pixel value greater than a triggering threshold respectively as a first event and a second event, comparing a time length of the first period with a filtering threshold to acquire time difference between an end point of the first period and a beginning point of the second period, comparing the time difference with a merging threshold, and acquiring relation between the first event and the second event according to comparison results of the filtering threshold and the merging threshold, so as to determine a detecting period of the motion detection function for actuation.

18 Claims, 5 Drawing Sheets

MOTION DETECTION METHOD AND RELATED MONITORING CAMERA APPARATUS

BACKGROUND OF THE INVENTION

1. Field of the Invention

The present invention relates to a motion detection method and a related monitoring camera apparatus, and more particularly, to a motion detection method and a related monitoring camera apparatus having preferred detection accuracy.

2. Description of the Prior Art

Motion detection function is the basic of security monitoring technology and smart image analyzing algorithm. As an object inside the frame is moved, the motion detection function detects variation of the frame and starts to record, and then recording data can be transmitted to a server for backup and further send an alarm to the user. The conventional motion detection function marks a contour of the object inside the frame, and decides whether the object is moved via a motion or deformation about the contour of the object. However, the conventional motion detection function cannot accurately identify conditions of the moving object if the object is moved slowly or the motion is slight or the targeted object is interfered by noise and an unnecessary object. Even though the object is moved normally, intermittent motion of the object may result in motion detection error and increase burdens of the motion detection apparatus. Design of a motion detection method capable of clearly identifying the motion of the object without decreasing operation efficiency is an important issue in the related monitoring industry.

SUMMARY OF THE INVENTION

The present invention provides a motion detection method and a related monitoring camera apparatus having preferred detection accuracy for solving above drawbacks.

According to the claimed invention, a motion detection method is applied to a monitoring camera apparatus with motion detection function. The motion detection method includes analyzing a pixel value of each frame from a video stream changed over time, defining a first period and a second period having the pixel value greater than a triggering threshold respectively as a first event and a second event, comparing a time length of the first period with a filtering threshold, acquiring time difference between an end point of the first period and a beginning point of the second period, comparing the time difference with a merging threshold, and acquiring relation between the first event and the second event according to comparison results of the filtering threshold and the merging threshold for determining a detecting period of the motion detection function and executing related actuation. The second period is started after the first period. The motion detection function is adapted to detect whether a moving object is positioned inside a monitoring range of the monitoring camera apparatus.

According to the claimed invention, a monitoring camera apparatus with motion detection function includes an image receiver and a processor. The image receiver is adapted to capture a video stream. The processor is electrically connected with the image receiver and adapted to analyze a pixel value of each frame from a video stream changed over time, define a first period and a second period having the pixel value greater than a triggering threshold respectively as a first event and a second event, compare a time length of the first period with a filtering threshold, acquire time difference between an end point of the first period and a beginning point of the second period, compare the time difference with a merging threshold, and acquire relation between the first event and the second event according to comparison results of the filtering threshold and the merging threshold for determining a detecting period of the motion detection function and executing related actuation. The second period is started after the first period. The motion detection function is adapted to detect whether a moving object is positioned inside a monitoring range of the monitoring camera apparatus.

The motion detection method of the present invention utilizes the time domain filter to increase detection accuracy. If the object is moved intermittently, two events happened in a short time can be merged to be the same event by the motion detection method, so as to effectively decrease an amount of the events and further to prevent the motion detection function from frequently shutting down and restarting. If the object is moved in the short time, the motion detection method can filter the transient event and some events happened over the specific time length can be reserved for actuating the motion detection function, so as to prevent the motion detection function from being actuated with increasing frequency due to accidental and transient touch. The motion detection method and the monitoring camera apparatus of the present invention utilizes the time domain filter to filter the event happened in the short time and actuated with increasing frequency. The motion detection method can clearly identify any conditions of the object and provide the preferred motion detection accuracy without wasting operation efficiency of the monitoring camera apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
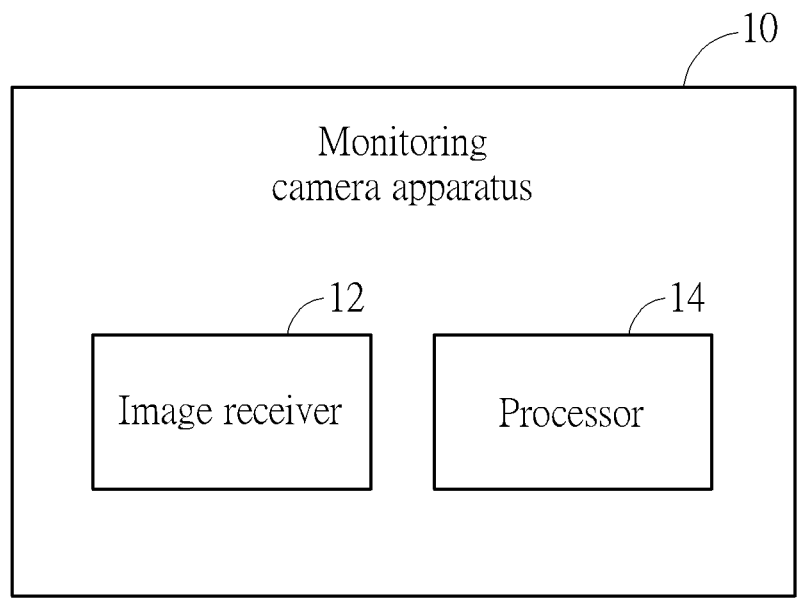
FIG. 1 is a functional block diagram of a monitoring camera apparatus according to an embodiment of the present invention.
Figure 2:
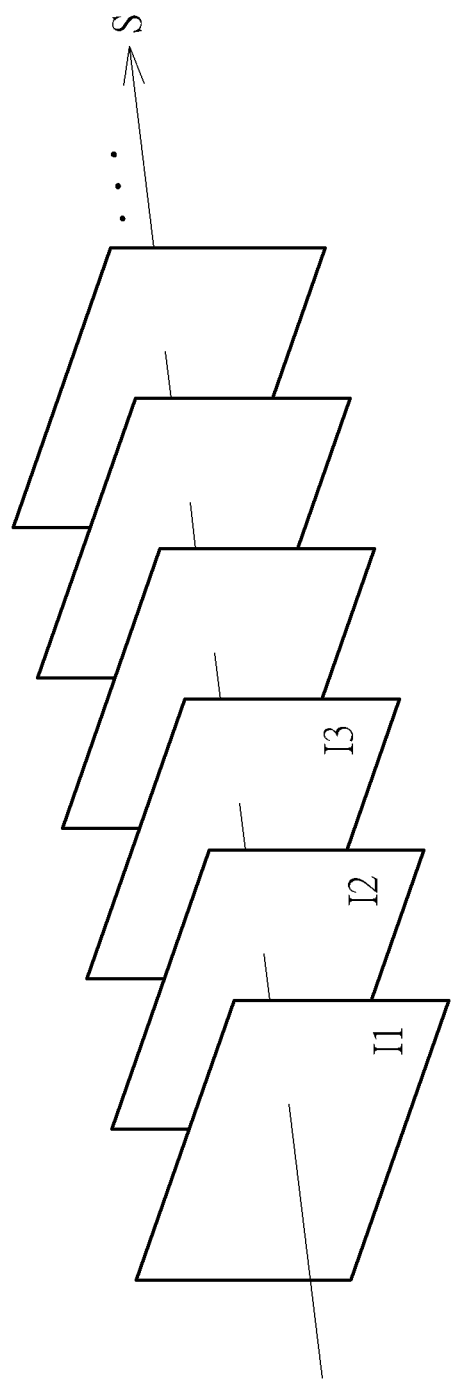
FIG. 2 is a diagram of a video stream according to the embodiment of the present invention.

Please refer to FIG. 1 and FIG. 2. FIG. 1 is a functional block diagram of a monitoring camera apparatus 10 according to an embodiment of the present invention. FIG. 2 is a diagram of a video stream S according to the embodiment of the present invention. The monitoring camera apparatus 10 can include an image receiver 12 and a processor 14. The image receiver 12 faces toward a monitoring range of the monitoring camera apparatus 10 for capturing a plurality of frames (such as the frames I1, I2 and I3) and forming the video stream S. The processor 14 is electrically connected to the image receiver 12, and can execute motion detection according to the frames I1, I2 and I3 of the video stream S. If an object is moved inside the monitoring range, a pattern corresponding to the object is appeared in the frames I1, I2 and I3. Position of the said pattern inside the frames is varied in accordance with motion of the object, and a pixel value of each frame I1, I2 and I3 can be varied due to position variation of the pattern. The motion detection method of the present invention can determine whether a moving object is appeared in accordance with variation of the pixel value. Every motion of the object can be defined as an event, and the event is used to actuate the motion detection function of the monitoring camera apparatus 10.

If the moving object is paused in a short while and then moved again, two events can be generated accordingly. If the object is paused often while walking, a plurality of transient events is generated, and the motion detection method of the present invention can effectively identify relation between several events generated by the video stream S, so as to determine whether some event belonging to noise should be filtered, and further to determine whether some event is maintained for following detection. The motion detection method can determine whether to actuate the motion detection function in accordance with variation of the pixel value about each frame, and further can determine a detecting period of the motion detection function for actuation. The relation between the events can be used to determine whether the events are independent events, and the motion detection function can be actuated repeatedly according to an amount of the independent events. If the events are merged, the motion detection function can be actuated by the merged event for decreasing computation loading of the monitoring camera apparatus 10.

A region of interest can be freely set inside the frame I1, I2 or I3, and the pixel value of the frame I1, I2 or I3 can be set as an amount of the pixel value about the region of interest. The region of interest can be the whole frame I1, I2 or I3, or can be a part of the frame I1, I2 or I3. For example, if the object is always appeared in some place inside the frame I1, I2 or I3, the said place can be set as the region of interest; further, all of the frame I1, I2 or I3 can be set as the region of interest. The region of interest can be set by the user according to actual demand, or can be automatically set according to some parameter of the object detected by the motion detection method. The said parameter can be an appearing frequency of the object. A shape of the region of interest can be a rectangular form, a circular form or any other form. Dimensions of the region of interest can be identical with or smaller than dimensions of the frame I1, I2 and I3.

Figure 3:
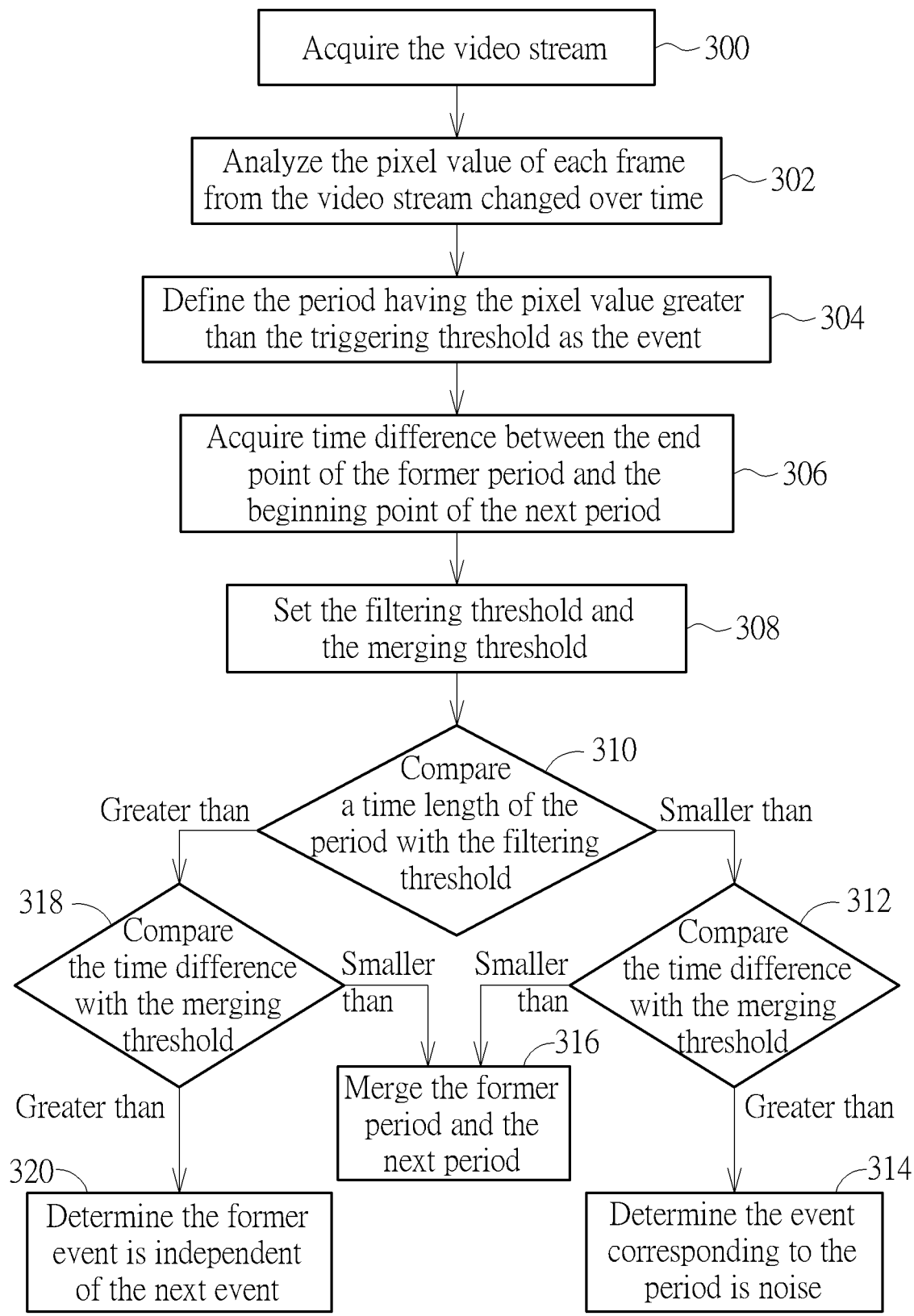
FIG. 3 is a flowchart of the motion detection method according to the embodiment of the present invention.
Figure 4:
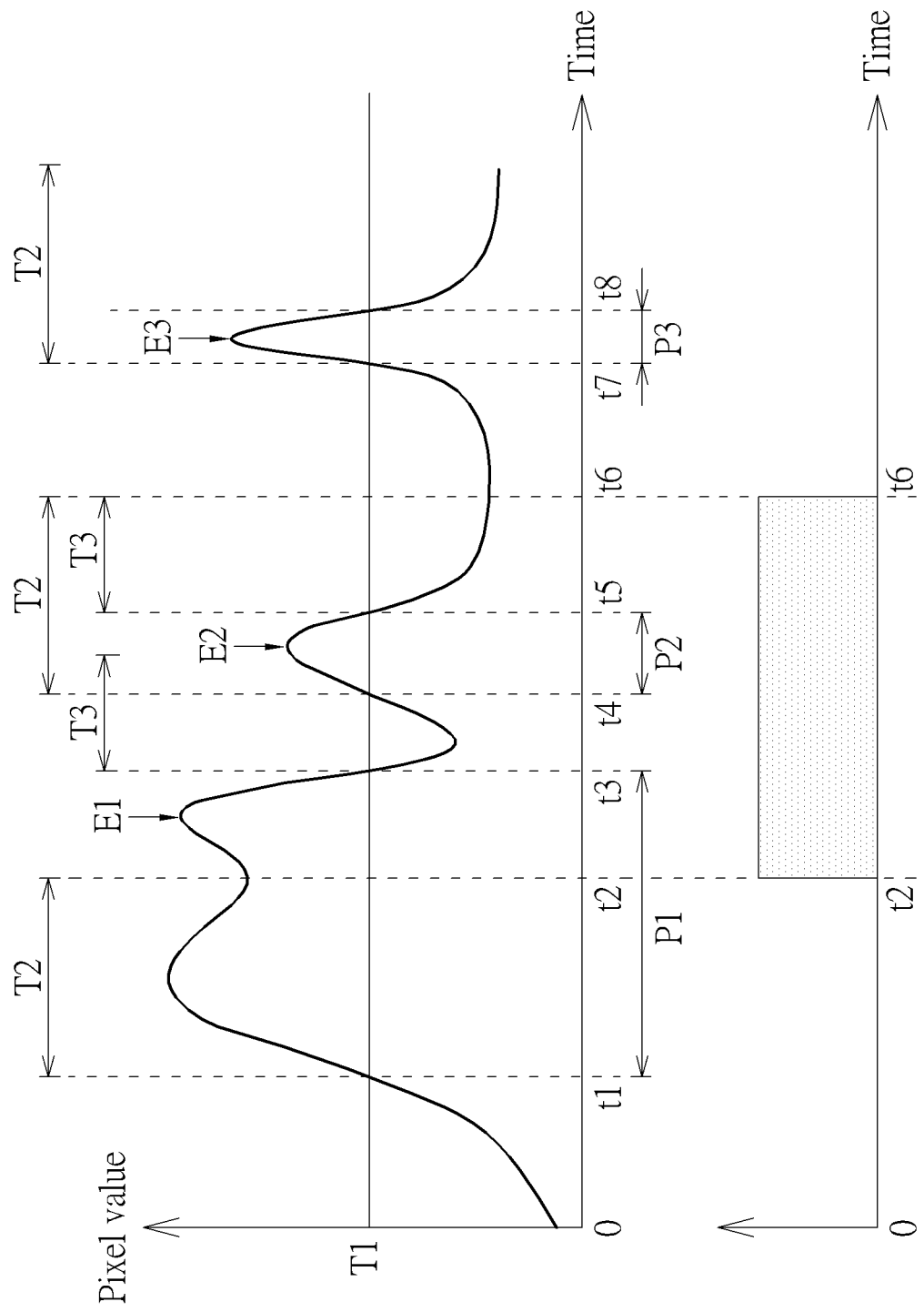
FIG. 4 and FIG. 5 are curved diagrams of the pixel value of the frame varied in different situations according to the embodiment of the present invention.
Figure 5:
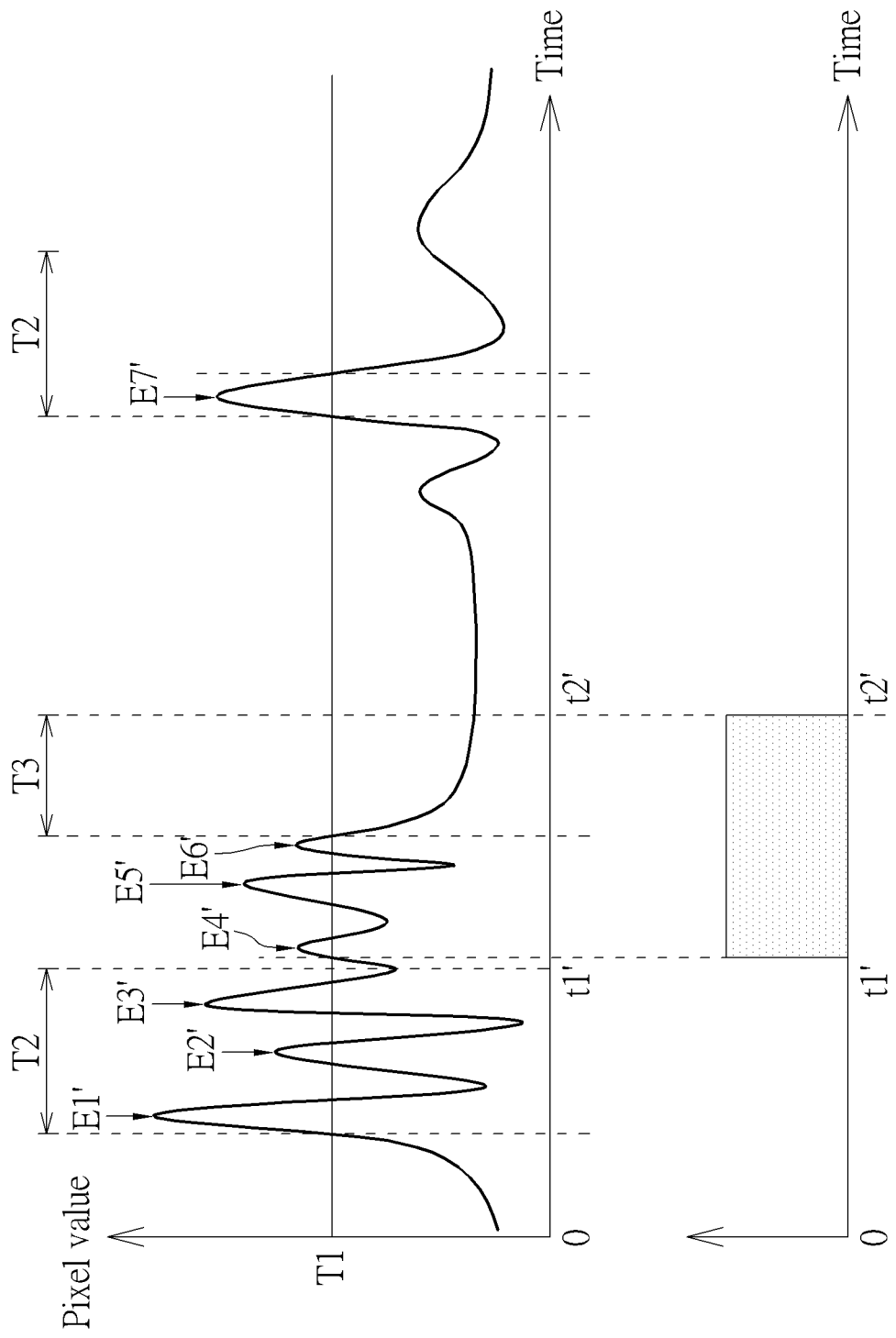

Please refer to FIG. 3 to FIG. 5. FIG. 3 is a flow chart of the motion detection method according to the embodiment of the present invention. FIG. 4 and FIG. 5 are curved diagrams of the pixel value of the frame varied in different situations according to the embodiment of the present invention. First, steps 300, 302 and 304 are executed that the processor 14 can acquire the video stream S captured by the image receiver 12, and analyze the pixel value of each frame I1, I2 and I3 from the video stream S changed over time. Then, the processor 14 can set at least one triggering threshold T1, and define some period having the frame's pixel value greater than the triggering threshold T1 as events. For example, the first period P1 can be defined as the first event E1, and the second period P2 can be defined as the second event E2, and the third period P3 can be defined as the third event E3. Sequence of the first period P1, the second period P2 and the third period P3 can be set as illustration shown in FIG. 4. The next period is started when the former period is ended, which means the former period is not overlapped with the next period.

Then, step 306 is executed to acquire time difference between an end point of the former period and a beginning point of the next period. For example, the first period P1 has the beginning point t1 and the endpoint t3, and the second period P2 has the beginning point t4 and the end point t5. Steps 308 and 310 are executed to set the filtering threshold T2 and the merging threshold T3, and compare a time length of a selected period with the filtering threshold T2. When the time length of the selected period is smaller than the filtering threshold T2, step 312 is executed to compare the time difference acquired in step 306 with the merging threshold T3. As the said time difference is greater than the merging threshold T3, step 314 is executed to determine an event corresponding to the selected period is noise; as the said time difference is smaller than the merging threshold T3, step 316 is executed to merge the selected period and the next period as the same event. When the time length of the selected period is greater than the filtering threshold T2, step 318 is executed to compare the time difference acquired in step 306 with the merging threshold T3. As the said time difference is smaller than the merging threshold T3, step 316 is executed to merge the selected period and the next period as the same event; as the said time difference is greater than the merging threshold T3, step 320 is executed to determine the selected period is independent of the next period, and the two period are determined as different events.

Generally, the motion detection method of the present invention can preferably execute comparison of the filtering threshold T2, and then utilize a comparison result of the merging threshold T3 to determine whether the event is filtered. However, the motion detection method may execute comparison of the merging threshold T3, and then utilize a comparison result of the filtering threshold T2 and the related time length to determine whether the event is filtered or maintained. A curve shown in FIG. 4 can be variation of the pixel value of the frame changed over time, and the pixel value of the frame is varied due to motion of the object. In the first place, after executing the comparison of the filtering threshold T2, the first event E1 can be defined as the moving object is detected, however periods of the second event E2 and the third event E3 are short and cannot ensure that the moving object is detected or noise exists. Then, the comparison of the merging threshold T3 is executed. Because the stopping point of the first event E1 (which means the end point t3 of the first period P1) is close to the triggering point of the second event E2 (which means the beginning point t4 of the second period P2), the first event E1 and the second event E2 can be merged to be the same event. Further, because the stopping point of the second event E2 (which means the end point t5 of the second period P2) is far from the triggering point of the third event E3 (which means the beginning point t7 of the third period P3), its time difference is greater than the merging threshold T3 so that the second event E2 can be independent of the third event E3. The third event E3 cannot be merged into other event, and the time length of the third event E3 is smaller than the filtering threshold T2, so the third event E3 can be filtered as noise.

As the condition shown in FIG. 4, the first event E1 is merged into the second event E2, and the detecting period of the motion detection function can have the triggering point at time t1 and the stopping point at time t5. Besides, even though the first event E1 is merged into the second event E2, the detecting period of the motion detection function can be optionally adjusted according to the filtering threshold T2 and the merging threshold T3. For example, the filtering threshold T2 and the merging threshold T3 are predetermined periods, which are designed according to user's demand, and the detailed description can be omitted herein for simplicity. The motion detection method can set that a point of time t2 later than a start of the first period P1 (which means the beginning point t1) through the specific time length (which means the predetermined period of the filtering threshold T2) as the triggering point of the detecting period, and further set a point of time t6 later than a final of the second period P2 through the specific time length (which means the predetermined period of the merging threshold T3) as the stopping point of the detecting period. Moreover, if the first event and the second event are not merged, the triggering point of the first event can be a point of time (such as the point t2) later than the beginning point t1 through the time length of the filtering threshold T2, and the stopping point of the first event can be a point of time (not shown in figures) later than the end point t3 through the time length of the merging threshold T3.

That is to say, the motion detection method can detect variation of the frame's pixel value at the point t1, but the motion detection function is actuated after awhile (such as the predetermined period of the filtering threshold T2) to ensure that the variation of the frame's pixel value is resulted from real motion of the object; the motion detection function cannot be actuated by noise of the frame. In addition, although the object is stopped at the point t5, the motion detection method can stand over shutting down the motion detection function till the point t6 (being delayed for the predetermined period of the merging threshold T3). The frame's pixel value lower than the triggering threshold T1 may represent slight motion of the object instead of the object being stopped; the motion detection function which is not immediately shut down can detect complete behavior of the object and does not miss any detailed information.

In another situation, as shown in FIG. 5, some periods having the pixel value greater the triggering threshold T1 can be respectively defined as the first event E1', the second event E2', the third event E3', the fourth event E4', the fifth event E5', the sixth event E6' and the seventh event E7'. All of the above-mentioned events have the short period individually by comparing the related periods with the filtering threshold T2, so that the whole events cannot be determined as noise of the motion of the object. Therefore, the time difference between the end point of each period and the beginning point of the next period can be compared with the merging threshold T3. The first event E1', the second event E2', the third event E3', the fourth event E4', the fifth event E5' and the sixth event E6' can be merged into the same event, and the seventh event E7' is filtered as the noise. Final, the time length of the filtering threshold T2 is subtracted and the time length of the merging threshold T3 is added to define the triggering point and the stopping point of the merged event, and the detecting period of the motion detection function can be set between the point t1' and the point t2'.

In conclusion, the motion detection method of the present invention utilizes the time domain filter to increase detection accuracy. If the object is moved intermittently, two events happened in a short time can be merged to be the same event by the motion detection method, so as to effectively decrease an amount of the events and further to prevent the motion detection function from frequently shutting down and restarting. If the object is moved in the short time, the motion detection method can filter the transient event and some events happened over the specific time length can be reserved for actuating the motion detection function, so as to prevent the motion detection function from being actuated with increasing frequency due to accidental and transient touch. Comparing to the prior art, the motion detection method and the monitoring camera apparatus of the present invention utilizes the time domain filter to filter the event happened in the short time and actuated with increasing frequency. The motion detection method can clearly identify any conditions of the object and provide the preferred motion detection accuracy without wasting operation efficiency of the monitoring camera apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detection method applied to a monitoring camera apparatus with motion detection function, the motion detection method comprising:

analyzing a pixel value of each frame from a video stream changed over time;

defining a first period and a second period having the pixel value greater than a triggering threshold respectively as a first event and a second event, wherein the second period is started after the first period;

comparing a time length of the first period with a filtering threshold;

acquiring time difference between an end point of the first period and a beginning point of the second period;

comparing the time difference with a merging threshold; and acquiring relation between the first event and the second event according to comparison results of the filtering threshold and the merging threshold for determining a detecting period of the motion detection function and executing related actuation, wherein the motion detection function is adapted to detect whether a moving object is positioned inside a monitoring range of the monitoring camera apparatus.

2. The motion detection method of claim 1, wherein the first event and the second event are merged to determine as the same event when the time length of the first period is smaller than the filtering threshold and the time difference is smaller than the merging threshold.

3. The motion detection method of claim 1, wherein the first event is determined as noise when the time length of the first period is smaller than the filtering threshold and the time difference is greater than the merging threshold.

4. The motion detection method of claim 1, wherein the first event and the second event are merged to determine as the same event when the time length of the first period is greater than the filtering threshold and the time difference is smaller than the merging threshold.

5. The motion detection method of claim 1, wherein the first event is independent of the second event so that the first event and the second event are determined as different events when the time length of the first period is greater than the filtering threshold and the time difference is greater than the merging threshold.

6. The motion detection method of claim 1, wherein a comparison of the filtering threshold is executed and then the comparison result of the merging threshold is utilized to determine whether to filter the first event.

7. The motion detection method of claim 1, wherein the relation between the first event and the second event is acquired to determine whether to merge the first event and a second event, and then determine how the motion detection function is triggered by the first event, the second event or a merged event.

8. The motion detection method of claim 1, wherein the filtering threshold is a predetermined period, the motion detection method sets a triggering point of the first event is at a point of time later than a beginning point of the first period through the predetermined period.

9. The motion detection method of claim 1, wherein the merging threshold is a predetermined period, the motion detection method sets a stopping point of the second event is at a point of time later than an end point of the second period through the predetermined period.

10. A monitoring camera apparatus with motion detection function, comprising:
an image receiver adapted to capture a video stream; and
a processor electrically connected with the image receiver and adapted to analyze a pixel value of each frame from a video stream changed over time, define a first period and a second period having the pixel value greater than a triggering threshold respectively as a first event and a second event, compare a time length of the first period with a filtering threshold, acquire time difference between an end point of the first period and a beginning point of the second period, compare the time difference with a merging threshold, and acquire relation between the first event and the second event according to comparison results of the filtering threshold and the merging threshold for determining a detecting period of the motion detection function and executing related actuation;
wherein the second period is started after the first period, the motion detection function is adapted to detect whether a moving object is positioned inside a monitoring range of the monitoring camera apparatus.

11. The monitoring camera apparatus of claim 10, wherein the first event and the second event are merged to determine as the same event when the time length of the first period is smaller than the filtering threshold and the time difference is smaller than the merging threshold.

12. The monitoring camera apparatus of claim 10, wherein the first event is determined as noise when the time length of the first period is smaller than the filtering threshold and the time difference is greater than the merging threshold.

13. The monitoring camera apparatus of claim 10, wherein the first event and the second event are merged to determine as the same event when the time length of the first period is greater than the filtering threshold and the time difference is smaller than the merging threshold.

14. The monitoring camera apparatus of claim 10, wherein the first event is independent of the second event so that the first event and the second event are determined as different events when the time length of the first period is greater than the filtering threshold and the time difference is greater than the merging threshold.

15. The monitoring camera apparatus of claim 10, wherein a comparison of the filtering threshold is executed and then the comparison result of the merging threshold is utilized to determine whether to filter the first event.

16. The monitoring camera apparatus of claim 10, wherein the relation between the first event and the second event is acquired to determine whether to merge the first event and a second event, and then determine how the motion detection function is triggered by the first event, the second event or a merged event.

17. The monitoring camera apparatus of claim 10, wherein the filtering threshold is a predetermined period, the motion detection method sets that a triggering point of the first event is at a point of time later than a beginning point the first period through the predetermined period.

18. The monitoring camera apparatus of claim 10, wherein the merging threshold is a predetermined period, the motion detection method sets that a stopping point of the second event is at a point of time later than an end point of the second period through the predetermined period.

* * * * *